United States Patent [19]

Mouesca et al.

[11] Patent Number: 4,928,291
[45] Date of Patent: May 22, 1990

[54] CONTROL CLUSTER PROVIDED WITH REMOVABLE CONTROL ELEMENTS FOR A NUCLEAR FUEL REACTOR

[76] Inventors: Bruno Mouesca, Lotissement "Le Coteau", Saint-Maurice de Gourdans 01800 Meximieux; Bruno Ladouceur, 1 Bis C, rue Vignet Trouvé, 69270 Fontains S/Saone, both of France

[21] Appl. No.: 60,291

[22] Filed: Jun. 10, 1987

[30] Foreign Application Priority Data

Jun. 10, 1986 [FR] France ................................ 86 08381

[51] Int. Cl.⁵ ................................................. G21C 7/10
[52] U.S. Cl. .................................... 376/327; 376/440; 376/446; 403/372
[58] Field of Search ..................... 376/327, 446, 440; 403/372

[56] References Cited

U.S. PATENT DOCUMENTS

| | | | |
|---|---|---|---|
| 3,890,672 | 6/1975 | Berthagen | 403/372 |
| 4,064,004 | 12/1977 | Long et al. | 376/446 |
| 4,189,348 | 2/1980 | Donck et al. | 376/446 |
| 4,314,885 | 2/1982 | Edwards et al. | 376/327 |
| 4,381,283 | 4/1983 | Walton | 376/327 |
| 4,432,934 | 2/1984 | Gjertsen et al. | 376/327 |
| 4,492,668 | 1/1985 | Pilgrim, Jr. et al. | 376/440 |
| 4,684,499 | 8/1987 | Gjertsen et al. | 376/446 |
| 4,684,503 | 8/1987 | Shallenberger | 376/446 |
| 4,687,630 | 8/1987 | Gjertsen et al. | 376/446 |
| 4,711,756 | 12/1987 | Nakazato | 376/327 |
| 4,728,487 | 3/1988 | Cooney et al. | 376/327 |

FOREIGN PATENT DOCUMENTS

| | | | |
|---|---|---|---|
| 0012383 | 1/1984 | Japan | 376/440 |
| 0067492 | 4/1984 | Japan | 376/327 |
| 0067493 | 4/1984 | Japan | 376/327 |

Primary Examiner—Harvey E. Behrend

[57] ABSTRACT

Control cluster and method for the replacement of a control element in the control cluster comprising a plurality of arms and a plurality of control elements each comprising a shank for respectively passing through an arm. Each shank is provided with a threaded portion situated entirely at a distance above the arm. A fastening piece is screwed on the threaded portion to lock the control element into abutment against the arm. During replacement, the shank and the fastening piece are cut between the arm and the threaded portion and thus the rod to be removed is released.

8 Claims, 4 Drawing Sheets

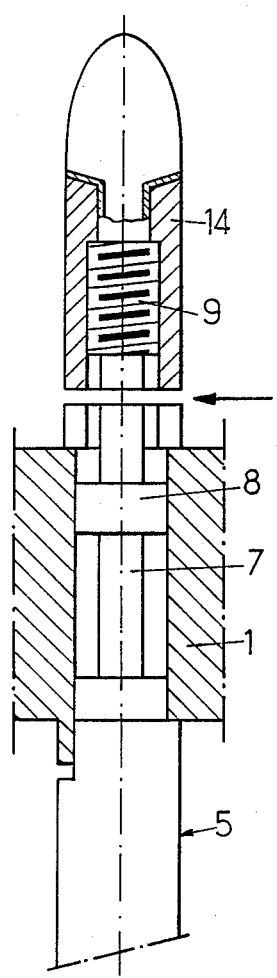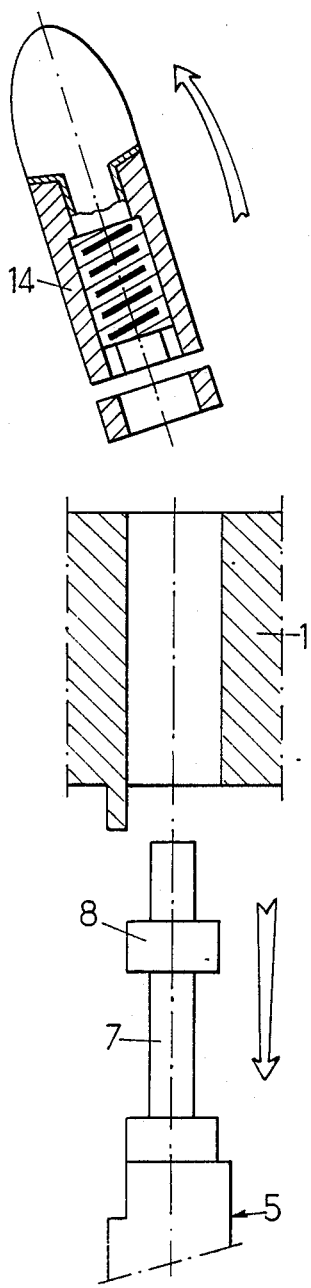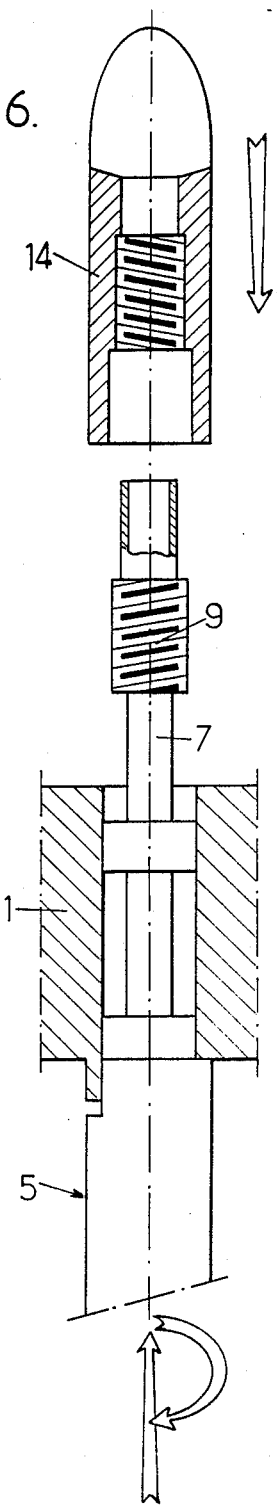

FIG. 7.
FIG. 8.
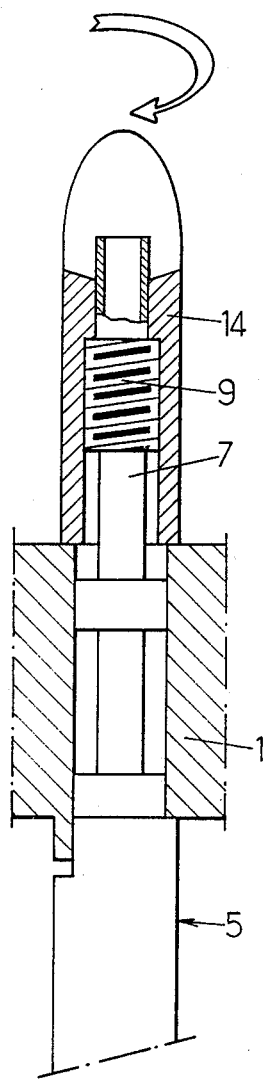
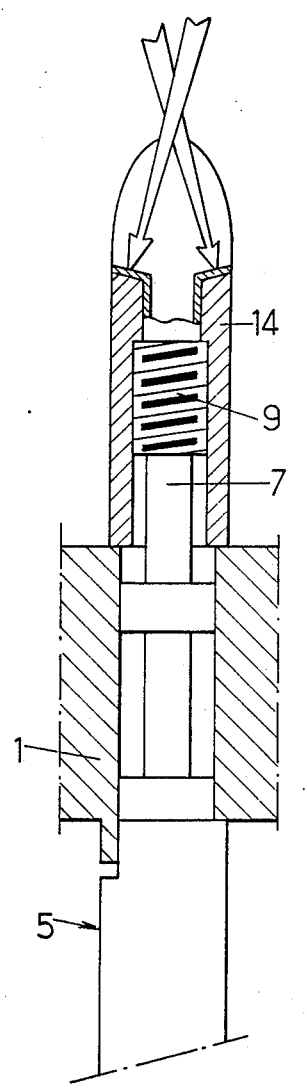

CONTROL CLUSTER PROVIDED WITH REMOVABLE CONTROL ELEMENTS FOR A NUCLEAR FUEL REACTOR

BACKGROUND OF THE INVENTION

The present invention relates to clusters of control elements or control clusters for controlling a nuclear reactor of the type comprising a spider having a plurality of arms angularly disposed about a vertical axis and each having at least one vertical sleeve defining a vertical bore and a plurality of control elements, each having a longitudinal axis, an upper plug having a longitudinally outwardly extending shank projecting into a respective one of said vertical bores and comprising shoulder means for longitudinal abutment against the sleeve. It relates also to a method of replacement of a control element in a cluster of the above defined type.

The invention is particularly suitable, although not exclusively, for control clusters insertable into fuel assemblies of cooled and moderated light water reactors, and particularly pressurized water reactors. In these reactors, each control cluster consists of a bundle of rods having a high absorption cross section for neutrons. The bundles are each supported by an upper piece called a "spider". Some of these clusters, for example, regulate the reactivity of the nuclear fuel assemblies all through the nominal operation of the reactor and, in particular, control the thermal power ouput of the reactor. Other clusters contain a consumable neutron absorbing material and are introduced into the core only during the first part of a fuel cycle of operation of the reactor. In other clusters, the rods or control elements simply consists of inert plugs designed to close the guide tubes provided in the assemblies, therefore limiting the flow rate of coolant which flows around the fuel rods. Finally, clusters are typically provided for varying the neutron spectrum in the core by modifying the moderator volume in the core of the reactor.

Control clusters of the above-defined type are already known. FR-A-2 439 457, relating to a cluster and a method of replacement of a control element in a spider, said control element having a longitudinally outwardly extending shank projecting from one end of the cross-head or spider, shows a device wherein the shank of the control element or rod is fitted inside a bore pierced in the spider. A fastening piece retains the shank inside the bore and is fixed by deformation on the spider, this fixation having a pre-determined resistance to downward longitudinal movement. By overcoming the retaining force in applying downwardly a greater force in the longitudinal direction, the rod will be driven out of the bore and freed. More precisely, the fastening of the rod to the spider is achieved by deformation of the end portion of the shank against the surface of the upper portion of the bore, which presents a larger cross-section than the lower portion of said bore.

The end portion of the shank is further deformed to enable it to again pass the narrower lower portion of the bore to release the rod to be replaced.

This type of cluster and the method of replacement of the rod thereof have several drawbacks.

During the positioning or withdrawal of a rod, a thrust force should be applied on the bore formed in the spider. This could result in deformations of the bore itself. It hence could become necessary to repair the spider when the number of rod replacements for a given bore is not limited a priori. These repairs of a radioactivated cluster (the activation is due to neutron bombardment of the spider during its stay in the core of the nuclear reactor) should always be avoided; this is not possible with the prior art devices described hereinabove.

It is also to be feared that the crushing by deformation of the end portion of the shank weakens this end portion because the forces applied during a deformation are not always exactly known; this weakening can even cause an undesirable separation between the rod and the spider during operation of the reactor.

The risk of dropping a rod subjected to multiple vibrations or any other transverse movements bringing the rod into repeated contact with its guiding elements in the assembly, even when the cluster is immobile vertically, and this during the operation of the reactor, therefore appears greater than in the case, for example, of fastening by screwing.

Finally, to drive the rod out of the sleeve during the replacement, a considerable force must be applied to push the shank through the bore. Assuming that the shank is not driven by percussion, which would be damaged for the rod, it is to be feared that jamming of the shank inside the bore could create a considerable shock, risking fissuration or other deterioration of the rod which has been particularly weakened due to its irradiation.

SUMMARY OF THE INVENTION

It is an object of the present invention to provide an improved cluster and an improved method of rod or control element replacement from this cluster. It is more particularly an object to provide a cluster which allows:

easy removal of the rods from the cluster irradiated during several irradiation cycles, the manufacture of each arm and its respective sleeve as an integral unit, therefore eliminating brazed connections between these parts, retaining a screwed connection while avoiding unscrewing during disassembly. This allows positive fastening by screwing in applying a precisely known screwing torque, while disassembly does not create jamming problems encountered with stainless steel against stainless steel contacts, re-utilization without alteration of the spider after disassembly of the control elements and, no a priori limitation in the number of replacements of a rod from a given sleeve of the spider.

It is another object of the invention to provide a method for easily replacing damaged control elements. Conjugate vibration forces and transverse movements generating wear on the outer surface of the rods in contact with the guide elements of the clusters damage the rods. Easy replaceability of these rods increases substantially the useful life of the remaining control elements of the cluster.

For this purpose, there is provided a control cluster for controlling a nuclear reactor comprising a spider having:

a plurality of substantially radial arms angularly disposed about a vertical axis each comprising at least one vertical sleeve defining a vertical bore of a predetermined internal diameter having a lower end surface, an upper end surface and a first predetermined length, a plurality of control elements, each having an upper plug with a longitudinally outwardly extending shank projecting into and non-rotatably received in a respective one of said vertical bores, each comprising shoulder means for abutment against the lower end surface of said respective vertical bore, said shank of the upper plug of each control element comprising spaced radially enlarged portions having a sliding fit in said respective vertical bore, having an overall length larger than the first predetermined length so that the shank has a portion which projects out of said respective vertical bore when said shoulder means are in abutment with said lower end surface, said portion of the shank which projects out of said respective vertical bore having a threaded part entirely located at a distance from the upper end surface of said respective vertical bore.

a plurality of threaded fastening pieces, each screwed on the threaded part of the shank of each respective control element for exerting a clamping force on said shank for locking and for supporting said respective control element on its associated arm.

It is another object of the invention to provide a control cluster wherein the shank of each control element comprises an upper terminal end portion deformable to come into abutting contact with a shoulder of the associated fastening piece, for blocking rotational movement of said fastening piece.

Furthermore, the invention provides a control cluster presenting the following features:

the internally threaded fastening pieces have a distal end slot so shaped as to allow screwing with a conventional screw driver, the shank is connected against rotation in the respective bore by blocking means consisting of downwardly protruding flat surfaces each located on a lower end portion of each respective sleeve and corresponding flat surfaces located on each of the control elements to be maintained into each of said respective sleeves, for mutual abutting contact of said downwardly protruding flat surfaces with said respective corresponding flat surfaces the distance between the upper end surface of each bore and the threaded portion of a corresponding shank, when the internally threaded fastening piece is blocked on said shank, is within the range of 3 to 10 cm.

It is another object of the invention to provide a method for the replacement of a control element in a control cluster for controlling a nuclear reactor comprising a spider having a plurality of arms angularly disposed about a vertical axis and directed substantially radially, each of said arms comprising at least one vertical sleeve defining a vertical bore of a predetermined internal diameter having a lower end surface and an upper end surface and a first predetermined length, a plurality of control elements, each having an upper plug having a longitudinally outwardly extending shank projecting into and non-rotatably received in a respective one of said vertical bores, each of said control elements comprising shoulder means for abutment against the lower end surface of said respective vertical bore, said shank having an overall length greater than the first predetermined length so that the shank has a portion which projects out of said respective vertical bore when said shoulder means are in abutment with said lower end surface, said portion of the shank which projects out of the sleeve having a threaded part entirely located at a distance from the upper end surface of said respective vertical bore, and a plurality of threaded fastening pieces, each screwed on the threaded part of the shank of each respective control element, said method comprising the steps of:

cutting together the shank of the control element to be removed and the respective threaded fastening piece screwed on said shank between the upper end surface of the respective vertical bore and the threaded portion of said shank, for releasing the control element, removing the control element from one side of the corresponding arm, and removing the fastening piece screwed on the threaded part of the shank and cut from the other side of said arm, introducing the shank of a new control element into said corresponding vertical bore and pushing upwardly said new control element until said new control element comes in to longitudinal abutment against the lower end surface of said corresponding vertical bore, and screwing a new threaded fastening piece on the threaded portion of the shank of said new control element for exerting a clamping force on said shank between said lower end surface and said new threaded fastening piece.

The method of replacement advantageously comprises a method for the replacement of a control element in a cluster as hereinbefore described, the shanks of each of the control elements having an upper end portion deformable into abutting contact with a shoulder arranged on the associated fastening piece, and further comprising the step of blocking the shank on the fastening piece by deformation of said upper terminal end portion on said shoulder of said associated fastening piece.

BRIEF DESCRIPTION OF THE DRAWINGS

The invention will be more clearly understood from the following description of a particular embodiment given by way of example. The description refers to the accompanying drawings in which:

FIGS. 4, 5, 6, 7 and 8 show the different steps in the replacement of a control element according to the method described in the invention.

DESCRIPTION OF PREFERRED EMBODIMENT

Figure 1:
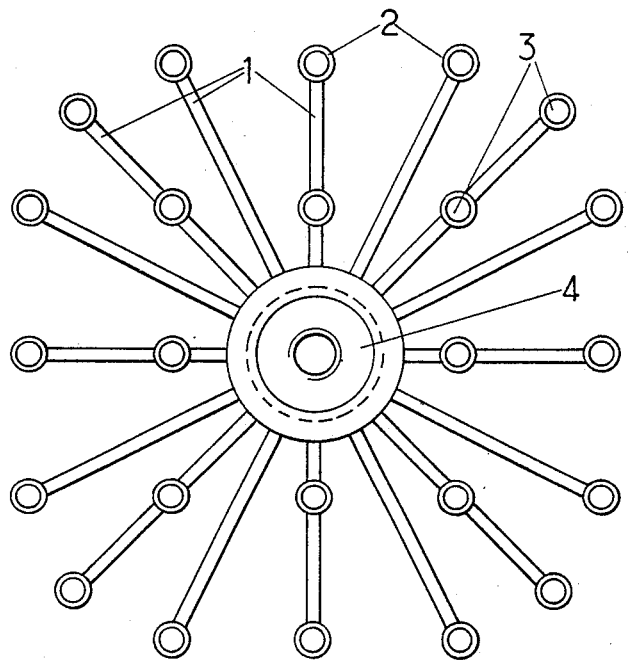
FIG. 1 is a plan view corresponding to a spider of a cluster according to the invention.

FIG. 1 is a plan view of a stainless steel spider belonging to a so-called control cluster. It comprises a plurality of arms 1 angularly disposed about a vertical axis, each having at least one vertical sleeve 2 pierced from end to end by a bore 3, each bore being arranged to receive a control rod containing a neutron absorbing material. A central portion 4 holds the group of arms in rigid relationship to each other and allows movement of the cluster in the vertical direction for removal or insertion of the control elements out of or into the core.

Figure 2:
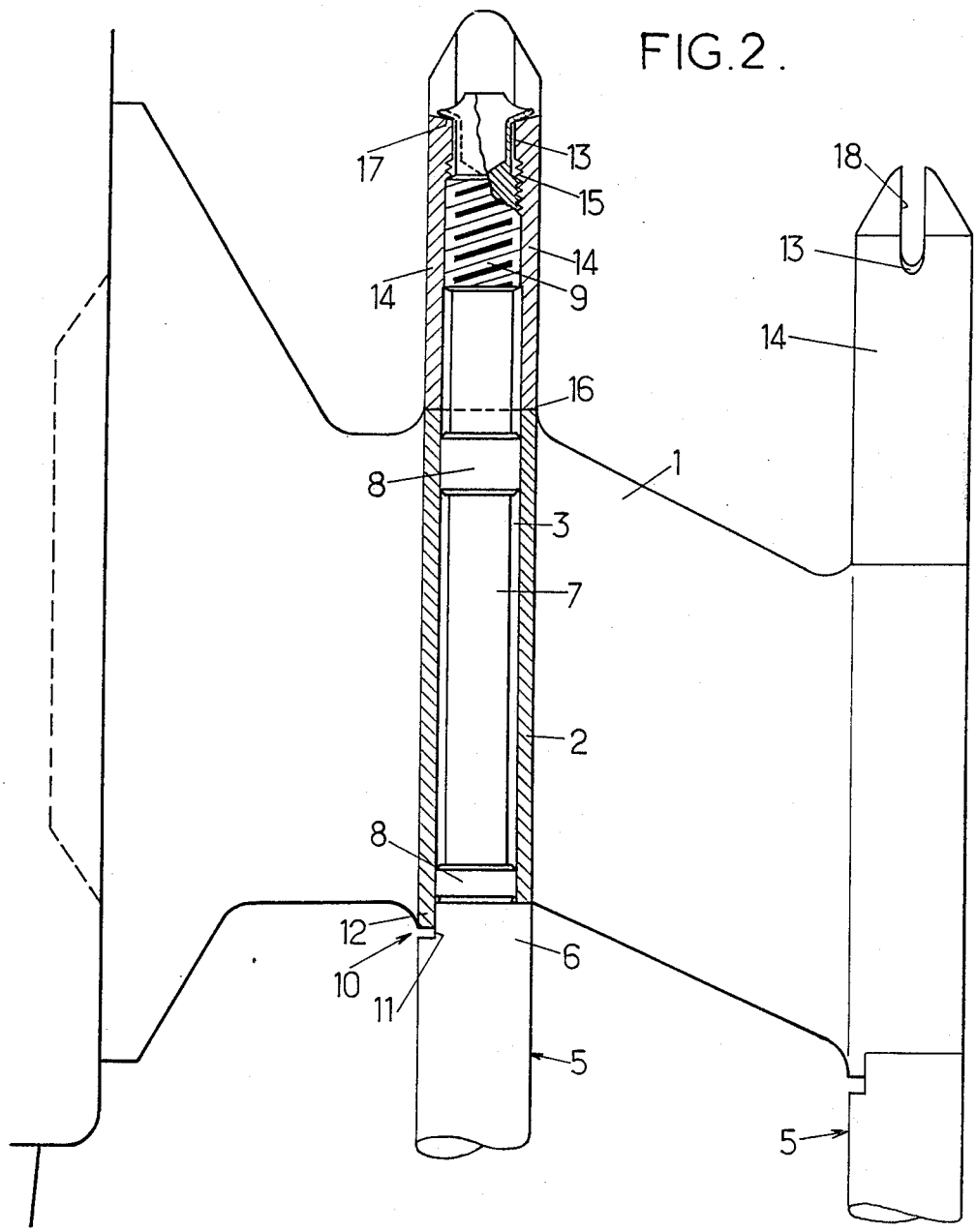
FIG. 2 is a front view partly in section, of an arm and of the upper part of two control elements forming part of a cluster according to the invention.

FIG. 2 shows more precisely the connection existing between a rod or control element 5 and the arm 1 to which the rod is fixed. The rod 5 is terminated by a plug 6 extended by a shank 7 introduced into the bore 3 formed in the sleeve 2 appearing in section in FIG. 2. The shank comprises parts 8 spaced from one another, of a diameter corresponding to that of the bore 3, for sliding fit in said bore. A projecting part of the shank above sleeve 2 comprises a threaded portion 9 situated entirely at a distance above the arm 1. The arm 1 and the rod 5 comprise blocking means 10 for relative blocking in rotation, comprising a flat surface on the rod 5 arranged to come into abutting contact with a lower projection surface 12 located on the sleeve 2 and downwardly projecting from the lower end surface of sleeve 2 or bore 3.

The parts 8 of the shank 7 spaced from one another and corresponding to the diameter of the bore 3 are constituted by cylinders coaxial and integral with the shank. The shank of the rod is terminated at the top by a thin collar 13. The fastening piece 14 tapped (at 15) as shown on FIG. 2 at is screwed onto the threaded portion 9 of the corresponding shank 7 and is supported on the upper end surface 16 of the bore 3 of the arm 1 to lock or block the rod in fixed position. The collar 13 is radially deformed and comes into abutment with a shoulder 17 of the fastening piece 14 to prevent any unscrewing of the latter. The fastening piece 14 has a terminal slot 18 allowing easy screwing to a predetermined tightening torque by a screwdriver (not shown).

The upper surface 16 of the bore 3 of the arm 1 is situated at a distance from the threaded portion 9 of the shank 7 when the rod is in abutment with the sleeve 2.

Figure 3:
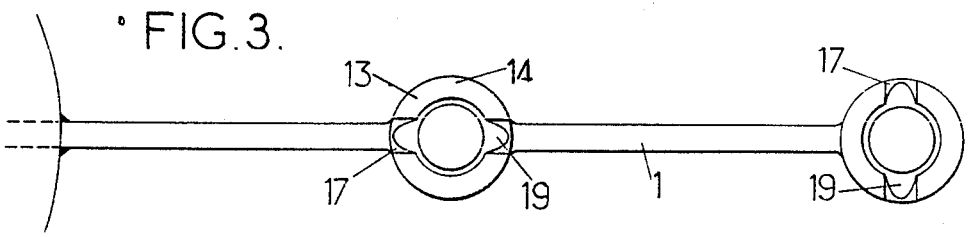
FIG. 3 is a view from above of FIG. 2

FIG. 3 is a partial plan view corresponding to FIG. 2. It shows the deformations 19 formed on the collar 13 of the shank 7 which enable the fastening part 14 to be stopped in rotation.

FIGS. 4 to 8 show diagrammatically the upper part of rod and of the associated arm 1 at the different steps of the replacement method described by the present invention.

FIG. 4 illustrates the first step of the method. The rod 5 being fixed to the arms by means of the threaded fastening piece 14 screwed to the threaded portion 9 of the shank 7 terminating the rod 5, the shank 7 and the fastening piece 14 are cut between the arm 1 and the threaded portion 9 of the shank 7 by any suitable means (see arrow in FIG. 4).

Among the cutting means to be more particularly used are thermal cutting means or plasma cutting means which avoid the formation of dust or chips of radio-activated stainless steel.

FIG. 5 shows the second step; the rod 5 is released from the arm 1 and removed downwards. The fastening piece 14 in two pieces, of which one is still screwed to the upper portion of the shank 7, is removed upwardly. The new rod (FIG. 6) is then placed (step 3) in position and introduced into the bore 3 of the sleeve 2 formed in the arm 1 until it comes into abutment on the lower end surface of the bore 3. It is then blocked in rotation by abutting contact of the flat surface 11 located on the plug 6 of the rod 5 with a downwardly protruding flat surface 12 located on the lower end portion of the sleeve 2. The shank 7 projecting from the other side of the arm, a new threaded fastening piece is screwed (FIG. 7) by means of a screwdriver engaged in the terminal slot 18 of the fastening piece.

The last step (FIG. 8) consists of producing an expansion of the grooved collar by deforming it on a shoulder 17 of the fastening piece 14. This operation avoids any inadvertent unscrewing of said piece and is preferably perform by means of a hydraulic press.

The invention covers all modifications of the described embodiments, particularly those in which
 the operations of replacement of a rod are performed entirely automatically or semi-automatically,
 the shank does not include portions spaced from one another for guiding the shank within the bore and minimizing sliding friction, but is in contact with the bore over its whole length, and
 the fastening part does not include a terminal slot, but is terminated by any shape allowing easy screwing, such as a square or a cruciform slot.

We claim:

1. Control cluster for controlling a nuclear reactor comprising
   (a) a spider having a plurality of arms angularly distributed about a vertical axis and directed substantially radially each of said arms comprising at least one vertical sleeve formed with a vertical bore of predetermined length opening into a lower end surface and an upper end surface of the sleeve;
   (b) a plurality of vertical control elements each for connection to a respective one of the vertical sleeves of said spider; and
   (c) a plurality of internally threaded fastening pieces, each for securing a respective one of said control elements to one of said sleeves;
   (d) wherein each of said control elements has an upper plug formed with a longitudinally upwardly extending shank projecting into a respective one of the vertical bores, formed with shoulder means for abutment against the lower ends surface of the respective vertical sleeve, comprising spaced radially enlarged portions having a sliding fit in and located entirely within the respective vertical bore, having an overall length from said shoulder means larger than the said predetermined length, whereby the shank has a distal portion which projects upwardly out of the respective vertical bore when said shoulder means are in abutment with said lower end surface, said distal portion of the shank which projects upwardly out of the respective vertical bore having a threaded portion entirely located above and at a distance from the upper end surface of the respective vertical bore and a part of reduced diameter between said threaded part and an uppermost of said enlarged portions,
   (e) wherein each of said internally threaded fastening pieces is tightly screwed on the threaded part of a respective one of the control elements and is in abutting contact with the upper surface of the respective sleeve, wherein the fastening piece exerts a clamping force on the shank for locking and supporting the respective control element on the associated sleeve, and
   (f) wherein each upper end surface is at a distance from the threaded portion sufficient to allow room for cutting of said fastening piece and of the part of reduced diameter of the respective shank, between said upper end surface and said thread portion of the shank.

2. Control cluster for controlling a nuclear reactor, comprising (a) a spider having a plurality of arms angularly distributed about a vertical axis and directed substantially radially, each of said arms comprising at least one vertical sleeve formed with a vertical bore of predetermined length opening into a lower end surface and an upper end surface of the sleeve;

(b) a plurality of vertical control elements each for connection to a respective one of the vertical sleeves of said spider; and (c) a plurality of internally threaded fastening pieces, each for securing a respective one of said control elements to one of said sleeves;

(d) wherein each of said control elements has an upper plug formed with a longitudinally upwardly extending shank projecting into a respective one of the vertical bores, formed with shoulder means for abutment against the lower ends surface of the respective vertical sleeve, comprising spaced radially enlarged portions having a sliding fit in and located entirely within the respective vertical bore, having an overall length from said shoulder means larger than the said predetermined length, whereby the shank has a distal portion which projects upwardly out of the respective vertical bore when said shoulder means are in abutment with said lower end surface, said distal portion of the shank which projects upwardly out of the respective vertical bore having a threaded portion entirely located above and a distance from the upper end surface of the respective vertical bore and a part of reduced diameter between said threaded part and an uppermost of said enlarged portions, (e) wherein each of said internally threaded fastening pieces is tightly screwed on the threaded part of a respective one of the control elements and is in abutting contact with the upper surface of the respective sleeve, whereby the fastening piece exerts a clamping force on the shank for locking and supporting the respective control element on the associated sleeve, (f) wherein said shank has an upper end portion extending upwardly beyond said threaded part, of low thickness, deformable into abutting contact with shoulder means which are formed on the respective fastening piece and are directed transversely to the vertical axis for blocking the fastening piece against rotation, and (g) wherein each upper end surface is at a distance from the threaded portion sufficient to allow room for cutting of said fastening piece and of the part of reduced diameter of the respective shank, between said upper end surface and said threaded portion of the shank.

3. Control cluster according to claim 1, wherein each said sleeve is integral with the respective arm.

4. Control cluster according to claim 2, wherein the upper end portion of said shank is deformed into a distal end slot of the respective fastening piece shaped to receive a screw driver.

5. Control cluster according to claim 1, wherein the spaced radially enlarged portions of each shank are of cylindrical shape.

6. Control cluster according to claim 1, wherein the internally threaded fastening pieces have a distal end slot so shaped as to allow screwing with a conventional screw driver.

7. Control cluster according to claim 1, wherein each said shank is connected against rotation in the respective bore by blocking means consisting of a portion of said sleeve downwardly protruding from the lower end surface, a vertically directed flat surface being formed on said downwardly protruding portion, and a corresponding vertical flat surface located on the shank to be maintained in said respective sleeve for mutual sliding contact of said flat surfaces.

8. Control cluster according to claim 1, wherein each upper end surface is at a distance from the threaded portion of the associated shank within the range of 3 to 10 cm.

* * * * *